(12) United States Patent
Gonzalez

(10) Patent No.: US 10,316,986 B2
(45) Date of Patent: Jun. 11, 2019

(54) DRIVING MECHANISM FOR A CONTROL VALVE AND A CONTROL VALVE

(71) Applicant: Duratex S.A., São Paulo (BR)

(72) Inventor: Daniel Gonzalez, Ipiranga (BR)

(73) Assignee: DURATEX S.A., Sao Paulo (BR)

( * ) Notice: Subject to any disclaimer, the term of this patent is extended or adjusted under 35 U.S.C. 154(b) by 93 days.

(21) Appl. No.: 15/523,973

(22) PCT Filed: Nov. 4, 2015

(86) PCT No.: PCT/BR2015/050200
§ 371 (c)(1),
(2) Date: May 3, 2017

(87) PCT Pub. No.: WO2016/070255
PCT Pub. Date: May 12, 2016

(65) Prior Publication Data
US 2017/0343130 A1    Nov. 30, 2017

(30) Foreign Application Priority Data
Nov. 4, 2014   (BR) .......................... 10 2014 027529

(51) Int. Cl.
| F16K 31/524 | (2006.01) |
| F16K 27/02 | (2006.01) |
| F16K 1/42 | (2006.01) |
| F16K 1/34 | (2006.01) |

(Continued)

(52) U.S. Cl.
CPC .......... F16K 31/52433 (2013.01); F16K 1/34 (2013.01); F16K 1/427 (2013.01);
(Continued)

(58) Field of Classification Search
CPC ........... F16K 31/52433; F16K 27/0236; F16K 11/22; F16K 1/427; F16K 31/52408;
(Continued)

(56) References Cited

U.S. PATENT DOCUMENTS

| 286,365 A | 10/1883 | Zane |
| 2,510,393 A | 6/1950 | Fraser et al. |

(Continued)

FOREIGN PATENT DOCUMENTS

| BR | PI0805329 A2 | 9/2010 |
| BR | PI1100876 A2 | 5/2013 |

(Continued)

OTHER PUBLICATIONS

Search Report for International Application No. PCT/BR2015/050200, dated Mar. 10, 2016, 3 pp.

*Primary Examiner* — Marina A Tietjen
(74) *Attorney, Agent, or Firm* — Dinsmore & Shohl, LLP

(57) ABSTRACT

The driving mechanism has a tubular housing coupled to a control valve and housing an activating cylinder and an activated cylinder, cooperating with each other and respectively coupled to a rod of a wheel and a sealing device. The driving mechanism presents: an inoperative condition, in which the activated cylinder is maintained in a closing position of the control valve; a first operative condition, obtained by the rotation of the activating cylinder in a first sense and in which the activated cylinder is maintained in a first opening position, until the activating cylinder is rotated in an opposite sense, returning the activated cylinder to its closing position; and a second operative condition, obtained by rotation of the activating cylinder in a second sense and in which the activated cylinder reaches a second opening position, from which it is automatically displaced back to its closing position, in a timed manner.

16 Claims, 9 Drawing Sheets

(51) Int. Cl.
*F16K 11/22* (2006.01)
*E03C 1/04* (2006.01)
*F16K 31/56* (2006.01)

(52) U.S. Cl.
CPC .............. *F16K 11/22* (2013.01); *F16K 27/02* (2013.01); *F16K 27/0236* (2013.01); *F16K 31/52408* (2013.01); *E03C 1/04* (2013.01); *F16K 31/563* (2013.01)

(58) Field of Classification Search
CPC .......... F16K 27/02; F16K 1/34; F16K 31/563; F16K 31/48; F16K 31/52; E03C 1/04
See application file for complete search history.

(56) References Cited

U.S. PATENT DOCUMENTS

| | | | | |
|---|---|---|---|---|
| 2,664,265 A | * | 12/1953 | Howser | F16K 1/34 251/253 |
| 2,952,273 A | * | 9/1960 | Griswold | A01G 25/162 137/624.16 |
| 4,343,456 A | * | 8/1982 | Zitzloff | F16K 27/02 251/255 |
| 10,054,240 B2 | * | 8/2018 | Thurau | F16K 31/563 |
| 2006/0157125 A1 | * | 7/2006 | Jacobs | A01G 25/165 137/624.11 |
| 2016/0018017 A1 | * | 1/2016 | Burlage | F16K 31/48 137/1 |

FOREIGN PATENT DOCUMENTS

| | | | | | |
|---|---|---|---|---|---|
| DE | 2201930 A1 | * | 7/1973 | ............ | F16K 1/32 |
| DE | 202014101096 U1 | | 4/2014 | | |
| EP | 2574843 A1 | * | 4/2013 | ............ | F16K 31/48 |
| FR | 1523635 A | * | 5/1968 | ............ | F16K 1/34 |
| FR | 1570442 A | * | 6/1969 | ............ | F16K 27/02 |
| GB | 832770 A | * | 4/1960 | ............ | F16K 31/48 |

* cited by examiner

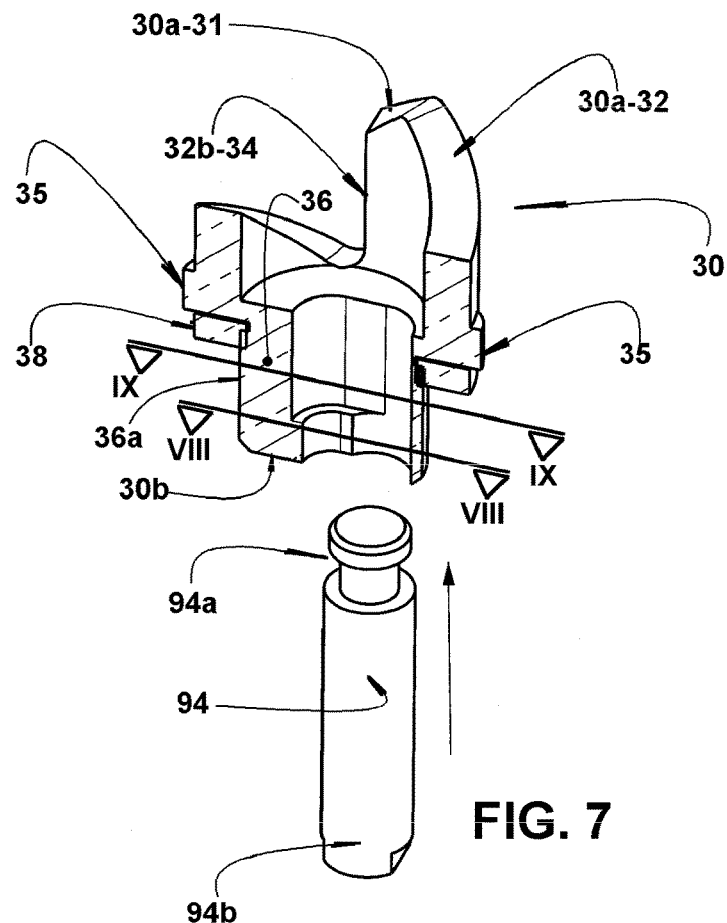
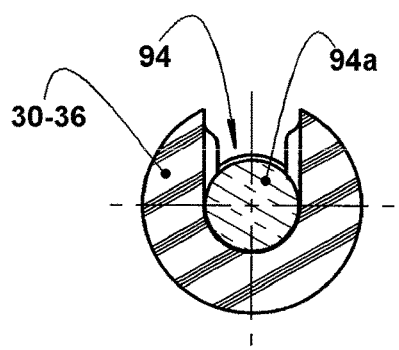
FIG. 8
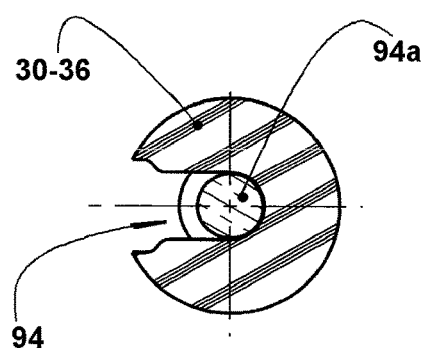
FIG. 9

DRIVING MECHANISM FOR A CONTROL VALVE AND A CONTROL VALVE

CROSS-REFERENCE TO RELATED APPLICATIONS

This application is the U.S. National Stage of International Patent Application No. PCT/BR2015/050200, filed Nov. 4, 2015, which claims priority to Brazilian Patent Application No. 10 2014 027529 0, filed Nov. 4, 2014.

FIELD OF THE INVENTION

The present invention refers to a driving mechanism to be applied in control valves in general and, more particularly, in control valves of mixing spouts or of faucets, in order to provide the manual or automatic closing of the control valve. The invention further refers to a control valve provided with said driving mechanism and incorporated to a faucet or operatively and hydraulically associated with a mixing spout or with other hydraulic device.

BACKGROUND OF THE INVENTION

As known in the state of the art, the control valves designed to control the supply of water to different hydraulic devices, such as spouts, faucets and the like, usually have a tubular body provided with the conventional liquid inlet and outlet openings, with an auxiliary opening, and also with an inner sealing seat which is operatively associated with a sealing means to be displaced, by a driving mechanism, between closing and opening positions of the control valve.

There are well known the driving mechanisms which are designed and constructed so as to allow different degrees for opening the sealing seat of the control valve and for closing it, by rotating the assembly formed by the driving rod and the wheel, upon by actuation of the user. These driving mechanisms, which are actuated by rotation of the wheel, require the user to use his hands, not only for opening, but also for closing the control valve.

There are also known in the art the driving mechanisms which are designed and constructed for allowing the manual opening of the control valve, in which the user simply displaces, axially and in a one-way sense, the driving rod, whereas the closing of the control valve is achieved in an automatic and timed way, usually by action of the hydraulic pressures reigning upstream and downstream the sealing seat. A known construction for a driving mechanism presenting an automatic and timed closure is disclosed in Brazilian document PI1100876-8.

Although both solutions, in which the driving mechanism is closed manually or in an automatic and timed manner, present advantages depending on the most adequate use condition for each operation, they have the drawback of not allowing, in a single construction, obtaining the two operational conditions to be selectively effected by the user, at his choice and according to each operation desired for the control valve and/or hydraulic device.

Aiming at allowing for the operational flexibility mentioned above, it was proposed the constructive solution disclosed and claimed in The Brazilian patent application PI0805329-4A2. This prior document proposes a driving mechanism presenting two movements capable of providing the control valve with a first operational condition in which it closes automatically, and a second operational condition in which the user defines the opening and closing times of the control valve and/or hydraulic device.

As it may be seen in the constructive solution proposed in document PI0805329-4, the timed (automatic) closing operational condition requires the user to exert an axial force over the driving rod, in order to displace the sealing element from the closed position to an opening position, in which the return of the sealing element, jointly with the driving rod, to the closed control valve position, is automatically achieved by the hydraulic and mechanical forces acting in the interior of the control valve. On the other hand, the manual closing operational condition made by the use requires him to rotatively and axially displace the driving rod, in which the rotative displacement is effected in a single sense, so as to lock the driving rod in a position in which it will be only displaced, by action of the user, through a new rotation imparted to the driving rod in the opposite sense, or by pressing it axially and then rotating it in an opposite sense, until axially unlocking the driving rod in order to be returned to the control valve closing position, by being axially displaced in a sense opposite to that which provides the opening of the control valve.

Thus, the PI0805329-4 solution requires an axial displacement of the driving rod in opposite senses, in order to provide the automatic closing operational condition and a compulsory rotational displacement of the driving rod for locking the control valve in the open operational condition, in which the user closes it manually.

Said prior solution requires two distinct movements of the driving rod for obtaining the two operational conditions—automatic closing and manual closing. The axial displacement of the driving rod is necessary and mandatory to obtain the automatic and timed closing operational condition.

The above prior art solution, although allowing, with a single construction, achieving the two closing operational conditions, has the drawback of not allowing the user to control, by means of a conventional manual actuation on the driving rod which usually ends in an activation button, the time of the automatic closing of the control valve. In this prior construction, the actuation of the user is to impart a downward axial displacement of the activation button, from the control valve closed position directly to the final position of the axial displacement travel, in order to obtain the automatic closing. In this type of operation, it is usually impracticable to control the axial travel for opening the control valve, making the closing time to be actually constant. The operation in the automatic closing condition is conducted with the same maximum displacement of the driving rod. It is not possible for the user to control, in an easy and ergonomic way, the different closing times of the control valve for each operation of the associated hydraulic device.

Another limitation of the prior art solution discussed above is the fact of not allowing the user, upon assembly of the control valve, or even after it is assembled, in order to carry out, by means of an extremely simple operation, the reduction of the automatic closing time to a value he judges more adequate, based on the maximum closing time of the project.

SUMMARY OF THE INVENTION

Due to the operational limitation of the above-mentioned prior art driving mechanism, it is a generic object of the present invention to provide a driving mechanism, with a simple and robust construction, which is easy to manufacture and presents a reduced number of components, to be applied in control valves in general and, more particularly, in the control valves of mixing spouts or of faucets, in order to provide, upon rotational displacement of a driving rod usually carrying a wheel, the manual control for opening and the manual or automatic control for closing the control valve.

The invention further relates to a control valve provided with said driving mechanism and incorporated to a faucet, or operatively and hydraulically associated with a mixing spout or with another hydraulic device.

The present driving mechanism is applicable to a control valve and comprises a tubular housing, to be coupled to the control valve and housing an activating cylinder and an activated cylinder, which cooperate with each other and which are respectively coupled to a wheel rod and to a sealing device of the control valve.

The driving mechanism presents: an inoperative condition, in which the activated cylinder is maintained in a control valve closing position; a first operative condition, obtained upon manually rotating the activating cylinder in a first sense and in which the activated cylinder is maintained in a first opening position, until the activating cylinder is manually rotated in the opposite sense, returning the activated cylinder to its closing position; and a second operative condition, obtained by rotating the activating cylinder in a second sense and in which the activated cylinder reaches a second opening position, from which it is automatically displaced back to its closing position, in a timed way.

With the construction above, the same construction for the driving mechanism may be applied to a control valve, in an easily dismountable manner, in order to allow the user to choose the type of operation for the control valve, either by a manual closing, or by an automatic and timed closing, it being only necessary to choose the rotation sense to be applied to the rod-wheel assembly.

BRIEF DESCRIPTION OF THE DRAWINGS

The invention will be described below, with reference being made to the appended drawings, given by way of example of a possible embodiment of the invention, and in which:

FIG. 7 represents a partially cut perspective view of the activated cylinder, illustrating, in an exploded manner, the end portion of the sealing device, to be axially engaged to the activated cylinder; and FIGS. 8 and 9 present cross-sectional views of the activated element, taken according to lines VIII-VIII and IX-IX in FIG. 7.

DESCRIPTION OF THE INVENTION

Figure 1:
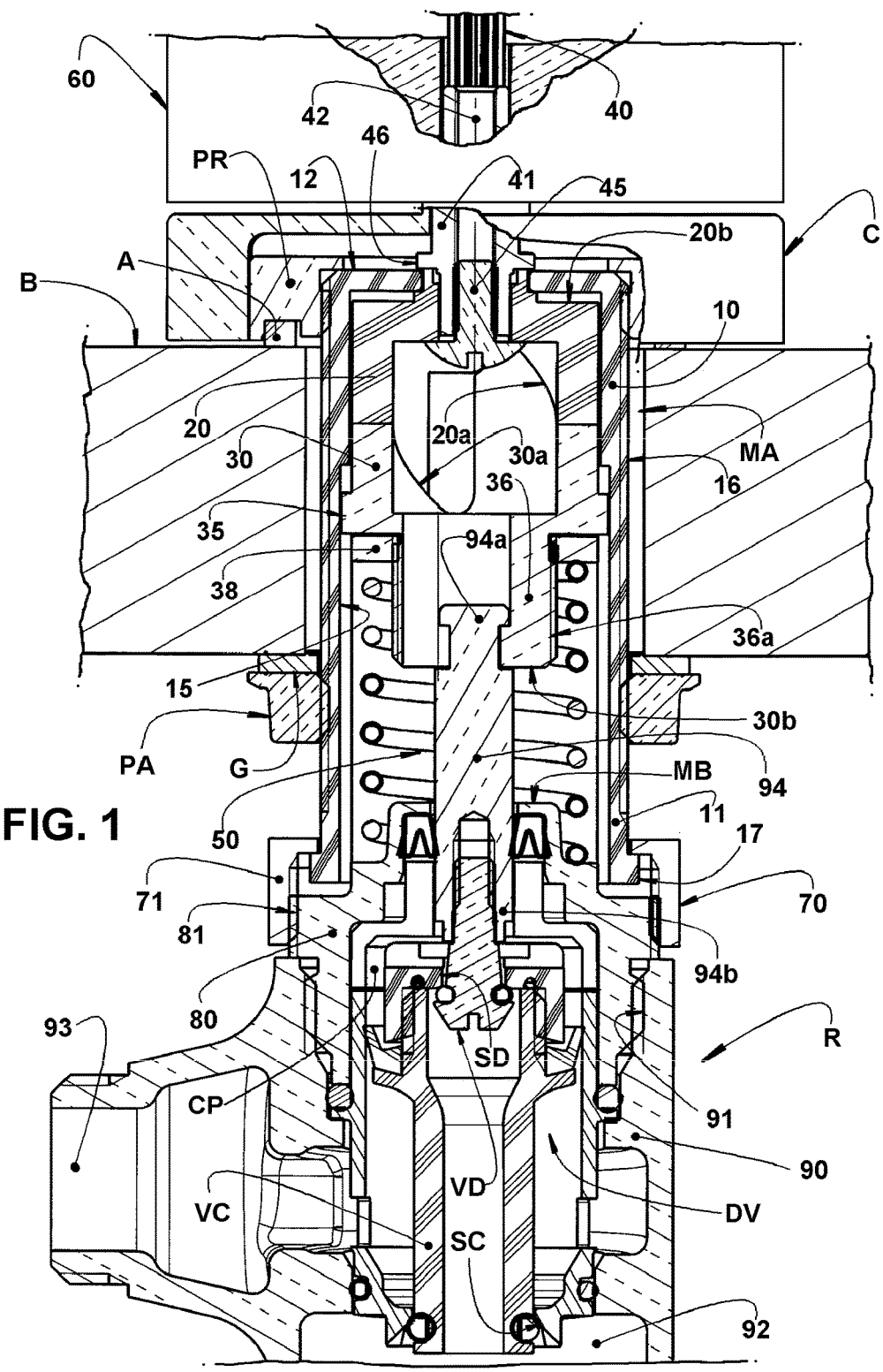
FIG. 1 represents a longitudinal sectional view of the present driving mechanism, applied to a control valve illustrated by way of example and showing the driving mechanism in the inoperative condition and the sealing device in a closed condition.

As illustrated in the appended drawings, the present driving mechanism MA is applicable to a control valve R of the type provided with a sealing device DV, which control valve R may present different constructive characteristics such as, for example, those illustrated in FIGS. 1 to 3 of the appended drawings and which will be described in further details hereinafter.

The driving mechanism MA comprises, basically: a tubular housing 10, usually cylindrical, preferably constructed in a polymeric material and presenting a mounting end 11, to be coupled to the control valve R, and a free end 12; an activating cylinder 20 and an activated cylinder 30, which are usually formed in polymeric material, provided in the interior of the tubular housing 10 and having impelling end faces 20a, 30a, maintained seated and cooperating with each other, and opposite end faces 20b, 30b, to be coupled to the driving rod 40 and to the sealing device DV, respectively.

In the illustrated construction, the tubular housing 10 is provided with two inner longitudinal grooves 15, and the activated cylinder 30 is provided with two outer radial projections 35, each of them being fitted into a respective longitudinal groove 15, in order to allow only the axial displacement of the activated cylinder 30 in the interior of the tubular housing 10.

Figure 1A:
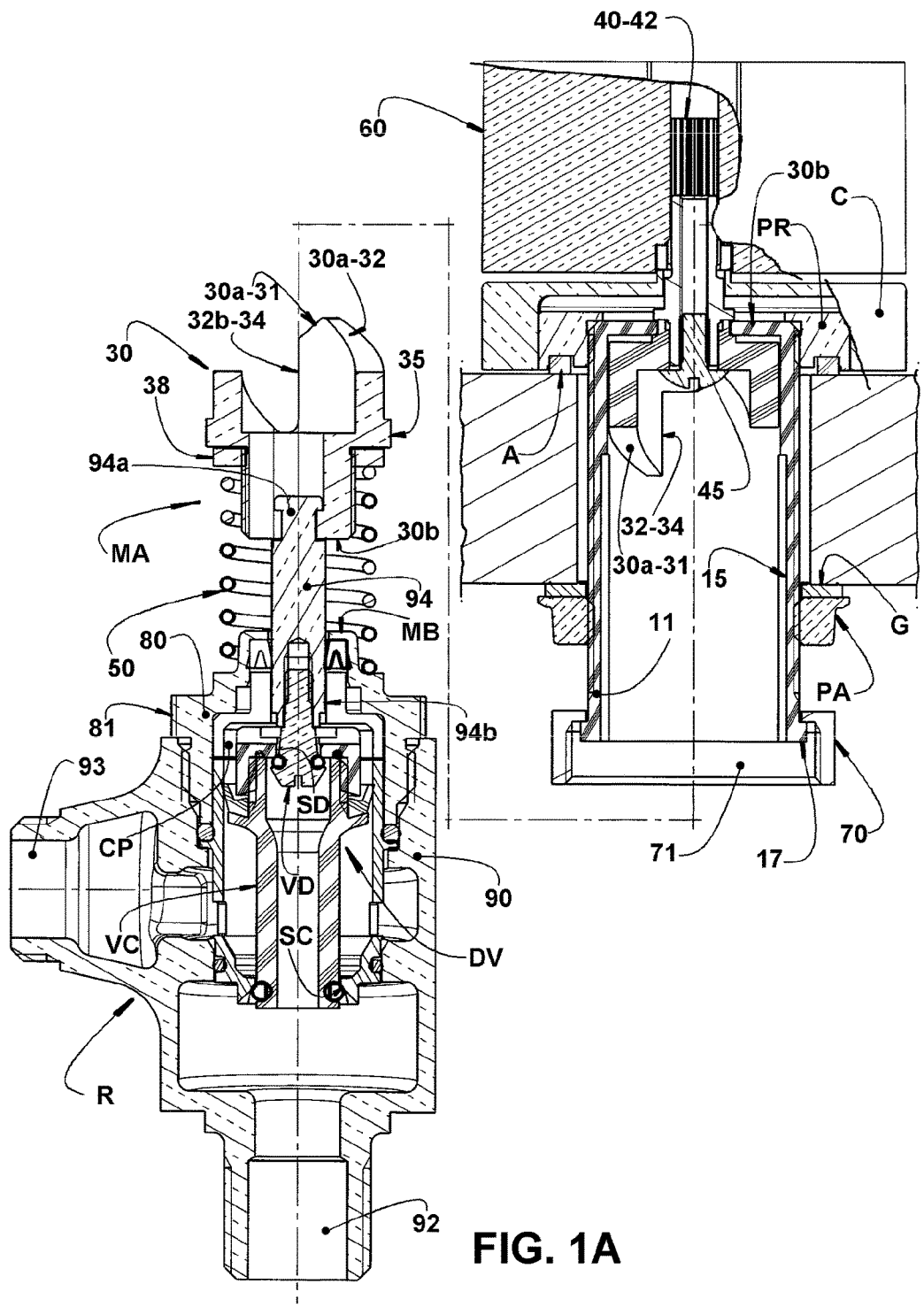
FIG. 1A illustrates a sectional view of FIG. 1, but in which the assembly, formed by the tubular housing and by the activating cylinder, being dismounted in relation to the assembly formed by the activated cylinder and the control valve.
Figure 2:
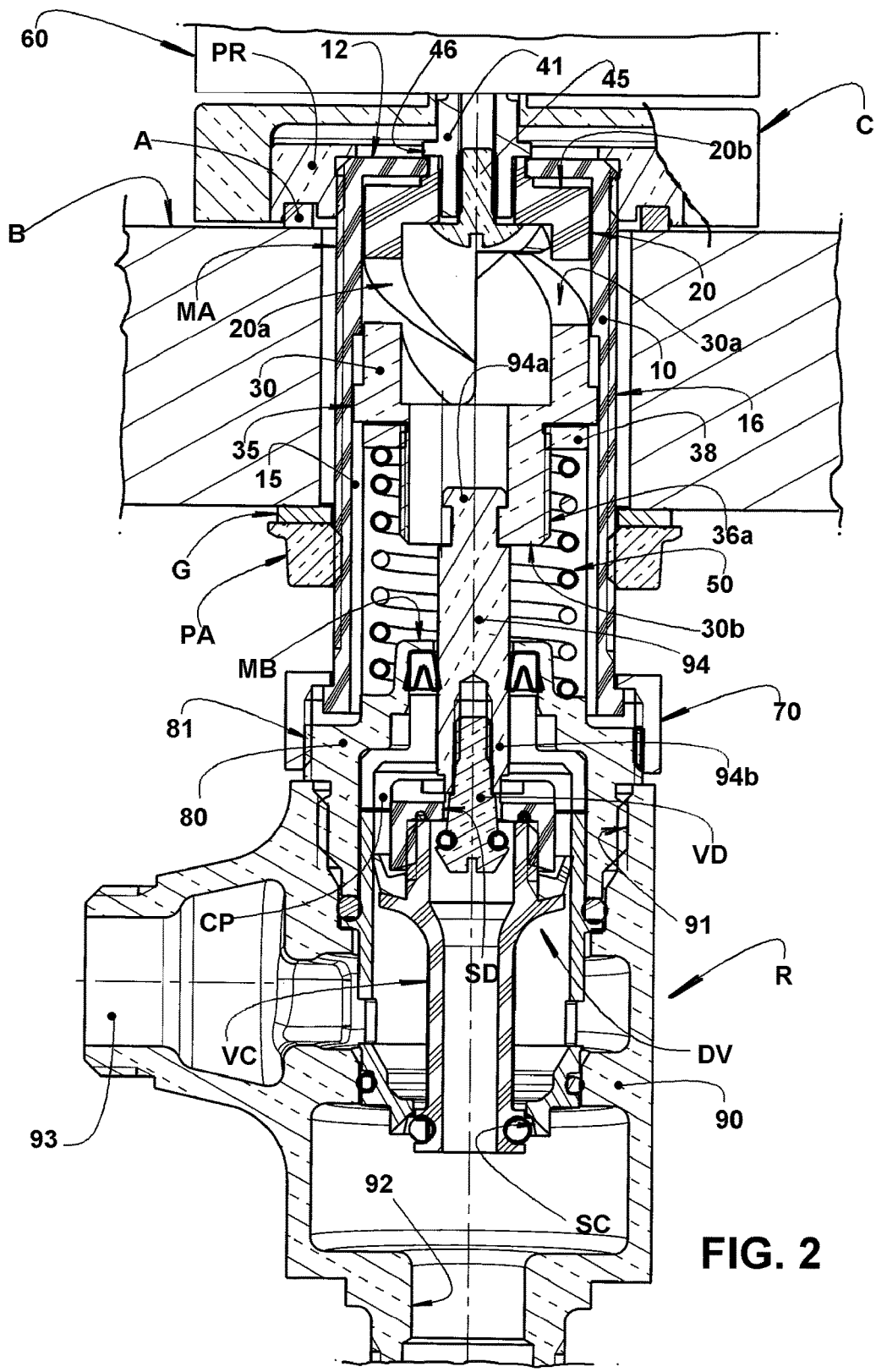
FIG. 2 represents a view similar to that of FIG. 1, but illustrating the driving mechanism at the beginning of its actuation to the first operative condition, of manual closing, producing the opening of a triggering sealing means of the sealing device of the control valve.
Figure 2A:
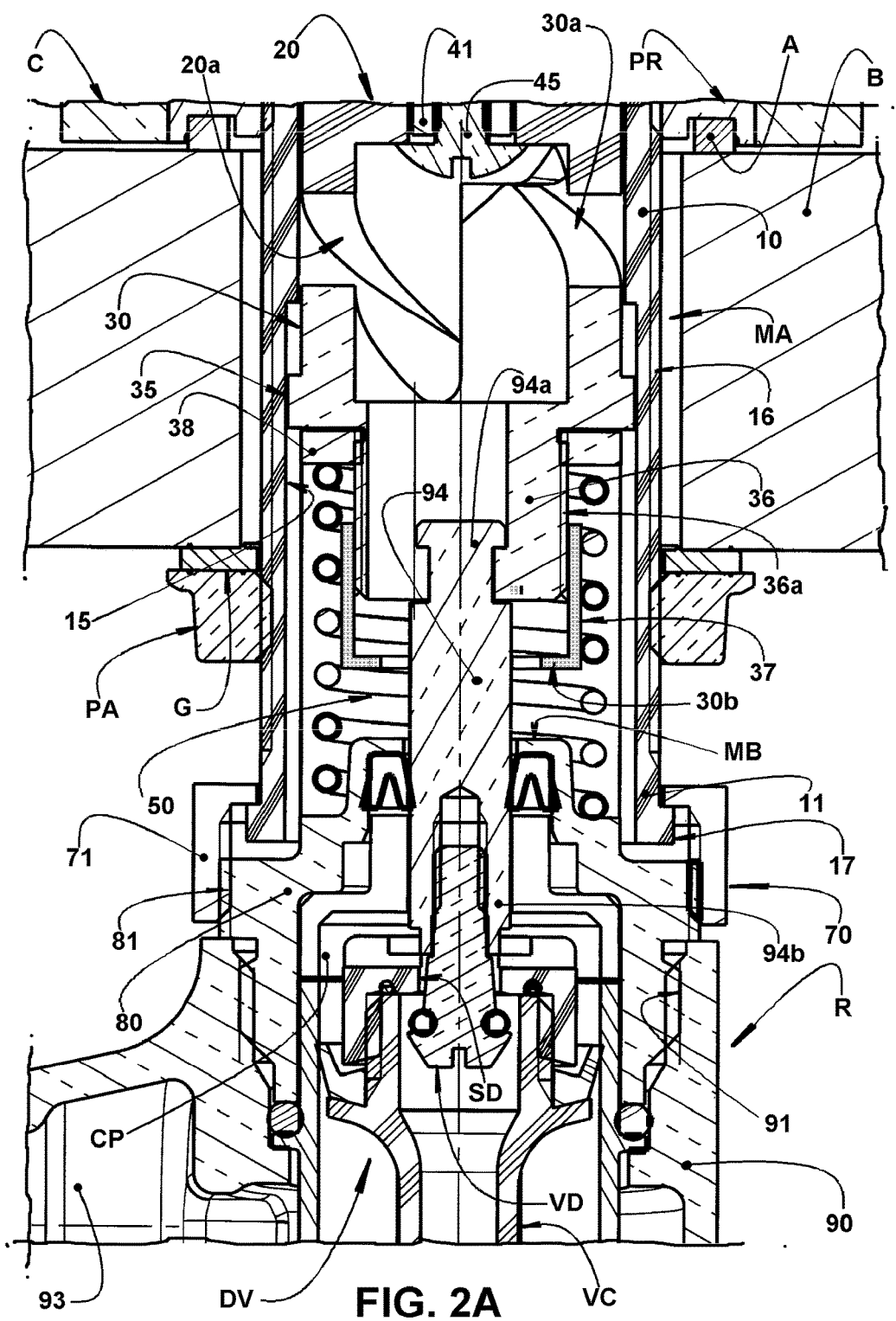
FIG. 2A represents an enlarged detail of part of FIG. 2, illustrating a constructive variant for the activated cylinder.
Figure 3:
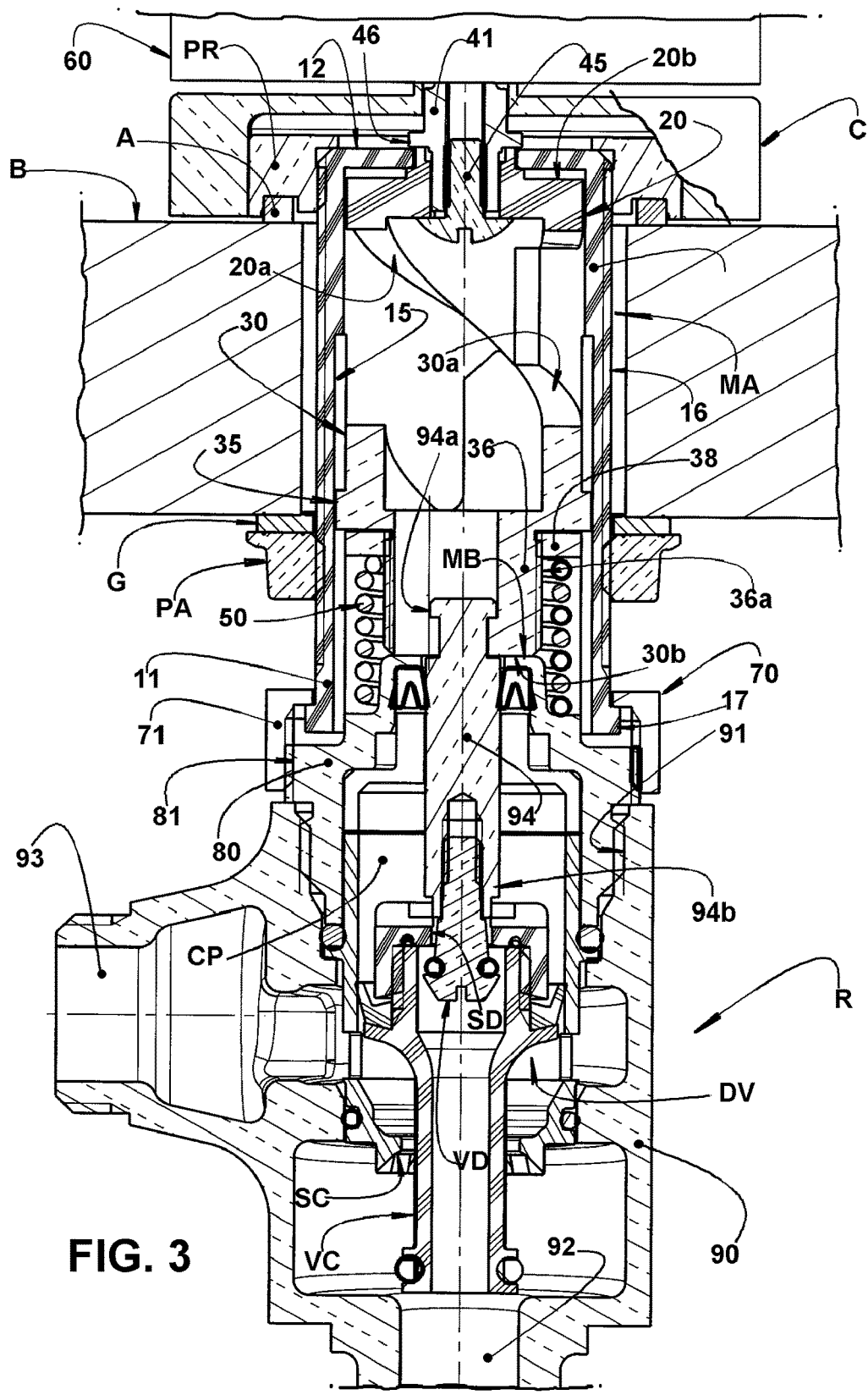
FIG. 3 represents a view similar to that of FIG. 2, but illustrating the driving mechanism in the second operative condition associated with an automatic and timed closing.
Figure 4:
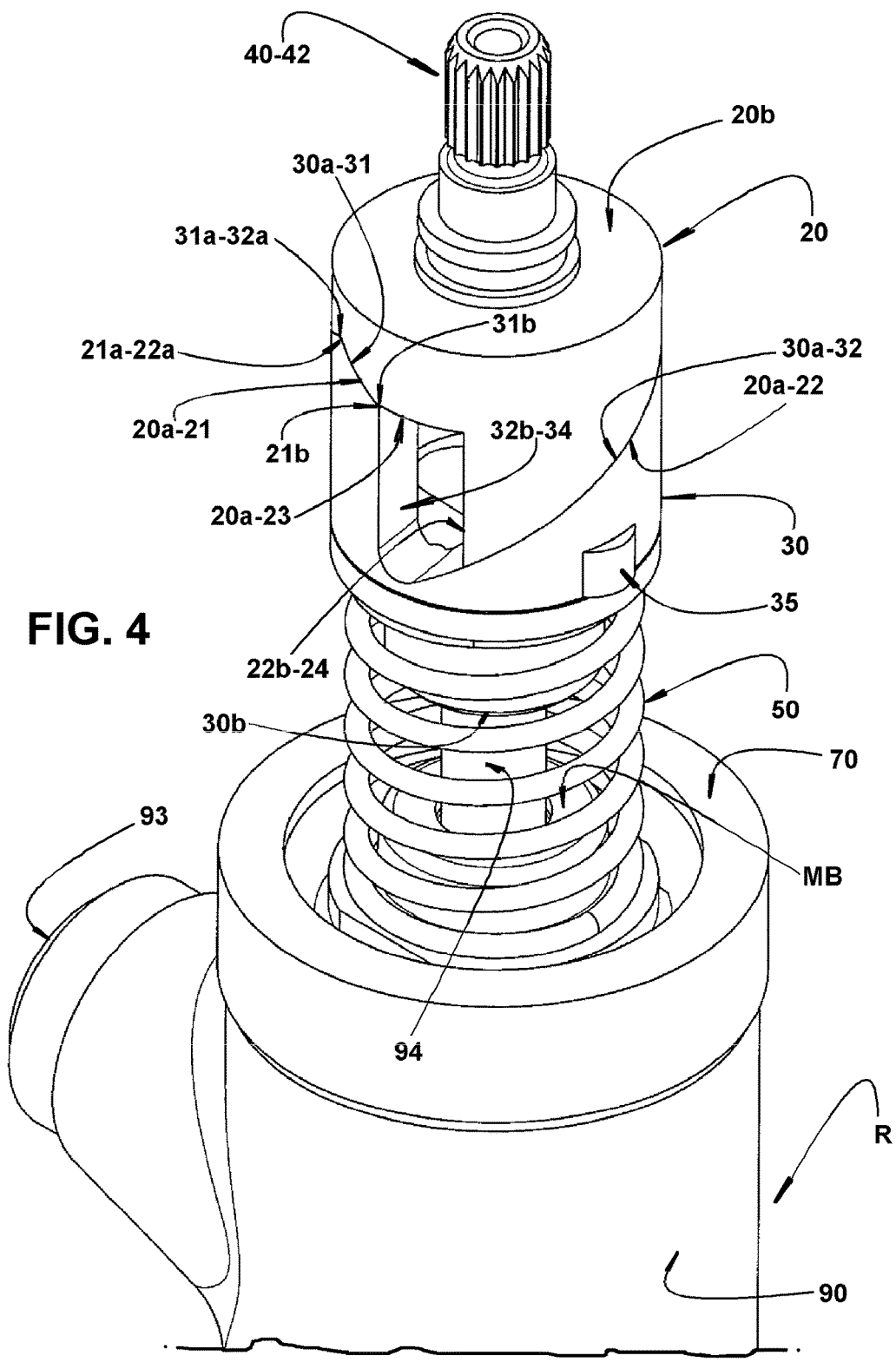
FIGS. 4, 5 and 6 represent perspective views of the driving mechanism coupled to the control valve and illustrated in the inoperative condition, in the first opening condition associated with the manual closing, and in the second opening condition of the control valve, with the automatic and timed closing, respectively.
Figure 5:
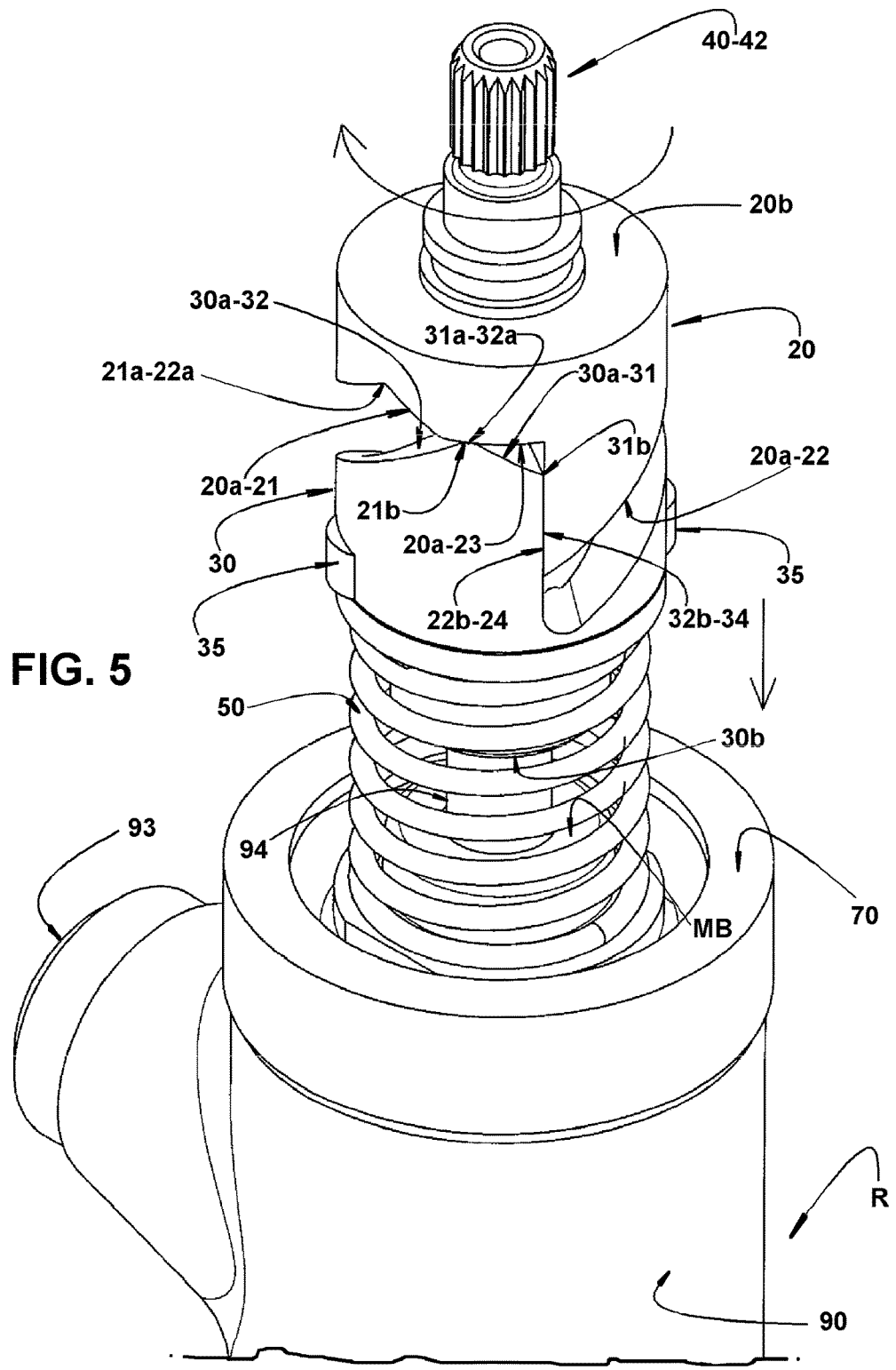
Figure 6:
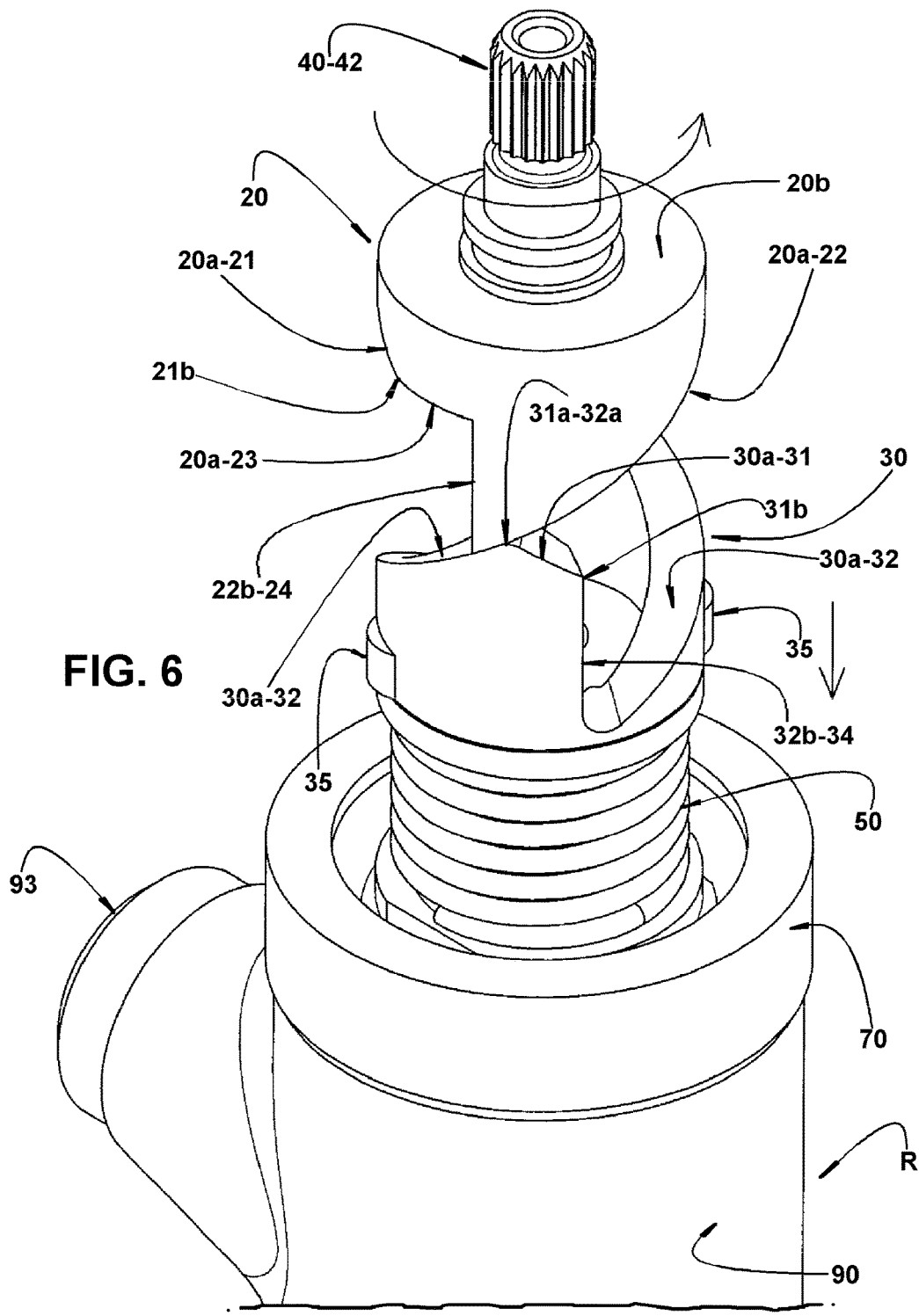

The construction of the driving mechanism MA, particularly of the activating cylinder 20 and the activated cylinder 30, is made so as to allow said mechanism to present three different operational conditions, as defined below:

an inoperative condition, illustrated in FIGS. 1, 1A and 4, in which the activated cylinder 30 is maintained in a closing position of the sealing device DV of the control valve R;

a first operative condition, illustrated in FIG. 5, which is achieved by manually rotating the rod 40 and the activating cylinder 20 in a first direction or sense, usually clockwise, as indicated in FIGS. 2 and 2A, and in which the activated cylinder 30 is maintained axially displaced in relation to the closing position and in a first opening position of the sealing device DV, until the rod 40 and the activating cylinder 20 are manually turned in an opposite sense, back to the closing position illustrated in FIGS. 1, 1A and 4, liberating the return of the activated cylinder 30 to its closing position illustrated in the same figures; and a second operative condition, illustrated in FIGS. 3 and 6 and achieved by rotating the rod 40 and the activating cylinder 20 in a second direction or sense, opposite to the first sense and generally anticlockwise, and in which the activated cylinder 30 reaches a second opening position, axially displaced in relation to the closing position, and from which the activated cylinder 30 is automatically displaced, in a timed way, back to its closing position, rotating the activating cylinder 20 and the rod 40 in said first sense, returning to the inoperative condition illustrated in FIGS. 1, 1A and 4.

In the construction illustrated in the drawings, the impelling end faces 20a, 30a of the activating cylinder and of the activated cylinder 30 are respectively provided, in opposite helical paths, with a first and with a second cam surface 21,22, and of a first and of a second cam follower surface 31,32, it being noted that in the inoperative condition of the driving mechanism MA, the impelling end faces 20a,30a of the activating and activated cylinders 20,30 mutually cooperate by means of the seating of the first and of the second cam surfaces 21,22 against the first and the second cam follower surfaces 31,32, respectively.

Thus, upon the manual rotation of the activating cylinder 20 in the first sense, usually clockwise and, subsequently, in the opposite sense, for taking the driving mechanism MA from the first operative condition and back to the inoperative condition, the impelling end faces 20a,30a of the activating and activated cylinders 20,30 cooperate with each other by means of the sliding of the first cam follower surface 31 along the first cam surface 21.

On the other hand, upon the manual rotation of the activating cylinder 20 in the second sense, usually anticlockwise and subsequently, upon the automatic rotation in the first sense, for taking the driving mechanism MA to the second operative condition and back to the inoperative condition, the impelling end faces 20a,30a of the activating and activated cylinders 20,30 cooperate with each other for the sliding of the second cam follower surface 32 along the second cam surface 22.

In the preferred construction illustrated in the drawings, the first and the second cam surfaces 21,22 of the activating cylinder 20 present a first common end 21a,22a and respective second ends 21b,22b which are axially and angularly offset from each other. Similarly, the first and the second cam follower surfaces 31,32, of the activated cylinder 30 have a first common end 31a,32a and respective second ends 31b,32b which are axially and angularly offset from each other.

The construction above allows that, in the inoperative condition of the driving mechanism MA, illustrated in FIG. 4, the activating and activated cylinders 20,30 remain stabilized, with the first common ends 21a,22a, of the first and of the second cam surfaces 21,22 being seated against the first common ends 31a,32a, of the first and of the second cam follower surfaces 31,32, with the cam surfaces 21,22 and with the cam follower surfaces 31,32 both extending in opposite senses and helically, but in the same axial direction which, in the proposed construction is turned to the control valve R.

In order to guarantee the stability of the driving mechanism MA in the first operative condition, illustrated in FIG. 5, the impelling end face 20a of the activating cylinder 20 is provided with a third cam surface 23 which extends, from the second end 21b of the first cam surface 21, along a circumferential extension covering at least part of the angular offset between the second ends 21b and 22b of the first cam surface 21 and of the second cam surface 22. With this construction, the third cam surface 23 is seated against the first common end 31a, 32a of the first and of the second cam follower surfaces 31, 32, maintaining the driving mechanism MA in the first operative condition and the activating cylinder 20 in the first opening position of the sealing device DV, until the activating cylinder 20 is manually rotated in the opposite sense, by the user manually acting over the driving rod 40, liberating the return of the activated cylinder 30 to its closing position, illustrated in FIG. 4.

Considering that the automatic closing is timed and not instantaneous, the second cam surface 22 has an extension more than three times larger than the extension of the first cam surface 21, as illustrated in the appended drawings.

As illustrated, the activating and activated cylinders 20,30 are preferably tubular, having their impelling end faces 20a, 30a with an annular shape, in an axial projection and defining the respective cam surfaces 21, 22, 23 and cam follower surfaces 31, 32.

The region comprised between the second ends 21b, 22b of the first and second cam surfaces 21, 22 in the activating cylinder 20 and the region comprised between the second ends 31b, 32b of the first and of the second cam follower surfaces 31, 32 in the activated cylinder 30 are defined, each one, by a respective step 24, 34, said steps 24, 34 being seated one against the other, limiting the rotation of the activating cylinder 20 in the first sense, when it reaches the first opening position, as illustrated in FIG. 5.

On the other hand, the rotation of the activating cylinder 20, in the second sense (usually anticlockwise), is limited by the maximum axial displacement of the activated cylinder 30 in the interior of the tubular housing 10, this displacement being defined by the maximum project distance between the opposite end face 30b of the activated cylinder and a stop means MB defined no control valve R, as described hereinafter.

As illustrated, the activated cylinder 30 has an end portion 36 of its extension, adjacent to its opposite face 30b, provided with a reduced external contour and with an external thread 36a, in which is engaged a nut 38 having an adjustable positioning along the end portion 36.

In FIG. 2A is illustrated a possible constructive variant of the activated cylinder 30, according to which the latter receives, in the external thread 36a of the end portion 36, a sleeve 37, internally threaded and which may have its positioning longitudinally adjustable along the end portion 36, and having a free end edge which defines the opposite end face 30b of the activated cylinder 30. The adjustment of the longitudinal positioning of the sleeve 37 allows varying the travel of the axial displacement of the activated cylinder 30 between its closing position and its second opening position. Thus, it is possible to limit the maximum closing time of the control valve, without impeding the user from reducing even more the automatic closing time, by reducing the angular rotation of the rod 40 by means of a wheel 60 coupled to the latter.

In order to maintain the impelling end faces 20a, 30a, of the activating and activated cylinders 20,30, seated and mutually cooperating, it is provided a spring 50 having one end seated against the activated cylinder 30 and the opposite end seated against the control valve R. Upon the provision of the sleeve 37, the spring 50 is mounted around the latter, so as to have one end seated against the nut 38 and the opposite end seated against the control valve R.

The provision of the nut 38 allows adjusting the tension to be exerted by the spring 50 against the activated cylinder 30, in order to provide the driving mechanism MA with an adequate elastic force for the automatic return of the activated cylinder 30 to the closing position illustrated in FIG. 4.

As illustrated in FIGS. 1, 2 and 3, the driving rod 40 is mounted in an axially locked and rotatively free manner, through the free end 12 of the tubular housing 10, in order to have an inner end 41 affixed to the activating cylinder 20 and an outer end 42 in which a wheel 60 is mounted.

In the illustrated construction, the fixation of the rod 40 to the activating cylinder 20 is made by a screw 45 seated against the free end 12 of the tubular housing 10 and engaged in a threaded inner hole of the rod 40, the latter being further provided with a small peripheral stop 46 to be externally seated against the free end 12 of the tubular housing 10. The outer end 42 of the rod 40 is preferably splined for engaging the wheel 60 according to a constructive arrangement conceptually well known.

In order to allow the driving mechanism MA to be mounted to the control valve R, the tubular housing 10 has its mounting end 11 constructed to retain, axially and in a rotatively free manner, a mounting nut 70 having a cylindrical skirt 71, internally threaded and to be engaged in an external thread 81 of the control valve R.

In the illustrated construction, the driving mechanism MA has its tubular housing 10 provided with an external thread 16 extending from the free end 12 of the tubular housing 10 and in which is mounted a retaining nut PR, to be seated, with the interposition of a ring A, usually of elastomer, over a bench B, and a tightening nut PA to be pressed, with the interposition of a gasket G, under the bench B, the mounting end 11 of the tubular housing 10 being provided with an external peripheral flange 17 in which is axially retained the mounting nut 70.

The mounting nut 70 further has the function of approximating the activating cylinder 20 the maximum possible to the activated cylinder 30. FIG. 1A shows the two assemblies separated, which will be united by tightening the mounting nut 70. The adjustment is carried out without causing any axial movement in the activated cylinder 30, thus making possible to remove all manufacturing gaps.

As illustrated in the drawings, the external thread of the control valve R may be defined around a castle bushing 80 mounted in an auxiliary nozzle 91 of a tubular body 90 of the control valve R. The tubular body 90 is usually cast in any metallic alloy adequate to this type of device, internally hollow and further provided with an inlet nozzle 92 and with an outlet nozzle 93.

The control valve R may be constructed, for example, with the characteristics described in patent application PI1100876-8 of the same applicant. Thus, the control valve R to be used associated with the driving mechanism MA may further comprise an impelling rod 94 of the sealing device DV, which rod has a first end 94a affixed, in a coaxial and detachable way, in the opposite end face 30b of the activated cylinder 30, and a second end 94b affixed to a triggering sealing means VD and to a control sealing means VC which are internal to the tubular body 90 of the control valve R and axially aligned with the rod 40, with the activating and activated cylinders 20,30 and with the impelling rod 94. The construction of the triggering sealing means VD and of the control sealing means VC may be carried out in different manners known in the art and which do not alter the fundamental features of the driving mechanism MA. As already mentioned before, the construction of the sealing device DV illustrated in the drawings presents a construction equal to that already described in patent application PI1100876-8.

Thus, the triggering sealing means VD and the control sealing means VC operate jointly with respective triggering seat SD and control seat SC, whose construction and operation are also known in the state of the art, jointly with the usual pressure chamber CP which is maintained in constant and restricted fluid communication (not illustrated) with the outlet nozzle 93 of the tubular body 90.

With the construction proposed herein, the impelling rod 94 of the sealing device DV is axially displaced by the axial displacement of the activated cylinder 30, opening and closing the control valve R, that is, the triggering seat SD and the control seat SC.

As it may be observed in FIGS. 1A, 7, 8 and 9, the installation of the driving mechanism MA, through the bench B, to be coupled to a control valve R is greatly facilitated by the provision of the mounting nut 70 which allows, not only a quick connection between the tubular housing 10 and the body 90 of the control valve R, facilitating the mounting and also the dismounting, but also the possibility of said threaded connection allowing the seating, with no gaps, of the impelling end face 30a of the activated cylinder 30 against the impelling end face 20a of the activating cylinder 20.

Another advantageous aspect of the proposed construction results from the coupling system between the activated cylinder 30 and the first end 94a of the impelling rod 94 of the sealing device DV. The tubular-shaped activated cylinder 30 presents an internal diametrical reduction close to its opposite end face 30b and also a longitudinal slot in said region, in order to allow the first end 94a of the impelling rod 94 to be easily fitted therein. Thus, the assembly of the driving mechanism MA may start by positioning the spring 50 around the portion of the impelling rod 94 which projects outwards of the body 90 of the control valve R. Subsequently, the activated cylinder 30 is engaged to the first end 94a of the impelling rod 94, with the spring 50 being compressed with the desired adjustment by the positioning of the nut 36 along the end portion 36.

In case it is further provided a sleeve 37 illustrated in FIG. 2A, it may have its positioning adjusted, before or after the original mounting of the driving mechanism-control valve assembly, in order to define the maximum time for the automatic and timed return of the driving mechanism to the inoperative condition.

Once the mounting phase described above is ended, and with the activating cylinder 20 being already positioned in the interior of the tubular housing 10 and affixed to the inner end 41 of the rod 40, the tubular housing 10 may be fitted through a respective hole provided in the bench B, so as to have the retaining nuts PR and tightening nuts PA seated on opposite sides of the bench B, retaining the tubular housing 10 in place, with the control valve R being or not already coupled to the mounting end 11 of the tubular housing 10, by means of the mounting nut 70. Then, over the retaining nut PR it may be mounted a finishing canopy C, and then the wheel 60 may be mounted in the outer end 42 of the rod 40.

While only one embodiment of the present control valve has been illustrated herein, it should be understood that several changes as to the form and arrangement of the different component parts may be made, without departing from the inventive concept defined in the claim set which accompanies the present disclosure.

The invention claimed is:

1. A driving mechanism for a control valve, provided with a sealing device, characterized in that it comprises:
   a tubular housing having a mounting end, to be coupled to the control valve and a free end;
   an activating cylinder and an activated cylinder, provided in the interior of the tubular housing and having impelling end faces, which are maintained seated and cooperating with each other, and opposite end faces to be coupled to a rod and to the sealing device, respectively,
   the driving mechanism presenting: an inoperative condition in which the activated cylinder is maintained in a closing position of the sealing device of the control valve;
   a first operative condition, obtained by the manual rotation of the rod and of the activating cylinder in a first direction and in which the activated cylinder is maintained axially displaced in relation to the closing position and in a first opening position of the sealing device, until the rod and the activating cylinder are manually rotated in opposite directions, liberating the return of the activated cylinder to its closing position; and a second operative condition, obtained by rotation of the rod and of the activating cylinder in a second direction, opposite to the first direction, and in which the activated cylinder reaches a second opening position, axially displaced in relation to the closing position and from which the activated cylinder is automatically displaced, in a timed manner, back to its closing position, rotating the activating cylinder and the rod in the first direction.

2. The mechanism, according to claim 1, characterized in that the impelling end faces of the activating cylinder and of the activated cylinder are respectively provided, in opposite helical paths, with a first and a second cam surface, and with a first and a second cam follower surface, in the inoperative condition of the driving mechanism the impelling end faces of the activating and activated cylinders mutually cooperating for the seating of the first and of the second cam surfaces against the first and the second cam follower surfaces, respectively; upon the manual rotation of the activating cylinder in the first direction and, subsequently, in the opposite second direction, in order to take the driving mechanism to the first operative condition and back to the inoperative condition, the impelling end faces of the activating and activated cylinders cooperate with each other by means of the sliding of the first cam follower surface along the first cam surface; and upon the manual rotation of the activating cylinder in the second direction, and subsequently, upon the automatic rotation in the first direction, in order to take the driving mechanism from the second operative condition back to the inoperative condition, the impelling end faces of the activating and activated cylinders cooperating with each other by means of the sliding of the second cam follower surface along the second cam surface.

3. The mechanism, according to claim 2, characterized in that the first and the second cam surfaces and the first and the second cam follower surfaces present, in the respective activating and activated cylinders, a first common end and respective second ends which are axially and angularly offset from each other.

4. The mechanism, according to claim 3, characterized in that the impelling end face of the activating cylinder is provided with a third cam surface which extends, from the second end of the first cam surface, by a circumferential extension covering at least part of the angular offset between the second ends of the first cam surface and of the second cam surface, said third cam surface being seated against the first common end of the first and of the second cam follower surface, maintaining the activated cylinder in the first opening position of the sealing device, until the activating cylinder is manually rotated in the opposite second direction, liberating the return of the activated cylinder to its closing position.

5. The mechanism, according to claim 2, characterized in that the second cam surface has an extension more than three times greater than the extension of the first cam surface.

6. The mechanism, according to claim 2, characterized in that the activating and activated cylinders are tubular, their impelling end faces presenting an annular shape, defining the respective cam surfaces and cam follower surfaces.

7. The mechanism, according to claim 6, characterized in that the region comprised between the second ends of the first and of the second cam surface in the activating cylinder and the region comprised between the second ends of the first and of the second cam follower surfaces in the activated cylinder are each defined by a respective step, said steps being seated against each other, limiting the rotation of the activating cylinder in the first direction, when it reaches the first opening position.

8. The mechanism, according to claim 6, characterized in that the rotation of the activating cylinder in the second direction is limited by the maximum axial displacement of the activated cylinder in the interior of the tubular housing, said displacement being defined by the maximum distance between the opposite end face of the activated cylinder and a stop means defined in the control valve.

9. The mechanism, according to claim 8, characterized in that the impelling end faces of the activating and activated cylinders are maintained seated and cooperating with each other by a spring having an end seated against the activated cylinder and an opposite end seated against the control valve.

10. The mechanism, according to claim 9, characterized in that the activated cylinder has an end portion of its extension, adjacent to the opposite face, provided with a reduced external contour and with an external thread, in which is adapted a nut having an adjustable positioning along the external portion, one end of the spring being seated against the nut and the opposite end being seated against the control valve.

11. The mechanism, according to claim 10, characterized in that the external thread of the end portion receives an internally threaded sleeve, having its positioning longitudinally adjustable along the external portion and having a free end edge which defines the opposite end face of the activated cylinder.

12. The mechanism, according to claim 1, characterized in that the rod is mounted, in an axially locked and rotatively free manner, through the free end of the tubular housing, in order to have an inner end affixed to the activating cylinder and an outer end in which is mounted a wheel, the tubular housing being provided with two internal longitudinal grooves, the activated cylinder being provided with two external radial projections, each being fitted into a respective longitudinal groove, in order to only allow the axial displacement of the activated cylinder in the interior of the tubular housing.

13. The mechanism, according to claim 1, characterized in that the mounting end of the tubular housing retains, rotatively, a mounting nut having a cylindrical skirt internally threaded and to be engaged in an external thread of the control valve.

14. The mechanism, according to claim 13, characterized in that the tubular housing is provided with an external thread, extending from the free end of the tubular housing and in which is mounted a retaining nut to be seated over a bench, and a tightening nut to be compressed under the bench, the mounting end of the tubular housing being provided with an external peripheral flange in which is axially retained the mounting nut.

15. The mechanism, according to claim 13, characterized in that the opposite end face of the activated cylinder is affixed, in a coaxial and detachable way, to a first end of an impelling rod of the sealing device of the control valve, to be axially displaced upon the axial displacement of the activated cylinder, opening and closing the control valve.

16. A control valve, characterized in that it comprises a driving mechanism as defined in claim 1.

* * * * *